US012737263B2

(12) United States Patent
Murray

(10) Patent No.: US 12,737,263 B2
(45) Date of Patent: Sep. 15, 2026

(54) OVERFLOW CONTAINER INDEXES FOR A DEDUPLICATION STORAGE SYSTEM

(71) Applicant: Hewlett Packard Enterprise Development LP, Spring, TX (US)

(72) Inventor: Callum Murray, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/925,311

(22) Filed: Oct. 24, 2024

(65) Prior Publication Data

US 2026/0119330 A1 Apr. 30, 2026

(51) Int. Cl.
*G06F 11/14* (2026.01)
*G06F 11/1446* (2026.01)
*G06F 16/215* (2019.01)

(52) U.S. Cl.
CPC ........ *G06F 11/1453* (2013.01); *G06F 16/215* (2019.01); *G06F 2201/80* (2013.01)

(58) Field of Classification Search
CPC . G06F 11/1453; G06F 16/215; G06F 2201/80
USPC .......................................................... 707/654
See application file for complete search history.

(56) References Cited

U.S. PATENT DOCUMENTS 8,782,368 B2 7/2014 Lillibridge et al.
9,633,033 B2 * 4/2017 Vijayan ............... G06F 16/1748
9,672,218 B2 6/2017 Lillibridge et al.
10,296,490 B2 5/2019 Camble et al.
10,353,867 B1 * 7/2019 Wong .................... G06F 16/162
10,365,974 B2 * 7/2019 Todd .................. G06F 11/1453
10,496,490 B2 12/2019 Chandrasekharan et al.
10,592,347 B2 3/2020 Todd et al.
10,884,643 B2 * 1/2021 Buratta ................. G06F 3/0641
2016/0170657 A1 6/2016 Suehr et al.
2018/0322062 A1 * 11/2018 Watkins ................ G06F 16/137
2021/0109772 A1 * 4/2021 Jaloma .................. G06F 9/5077
2021/0117106 A1 * 4/2021 Yang ..................... G06F 3/0632
2021/0216409 A1 * 7/2021 Haridas ................. G06F 16/174
(Continued)

OTHER PUBLICATIONS

Wikipedia, "Linked list", available online at <<https://en.wikipedia.org/w/index.php?title=Linked_list&oldid=1232016513>, Jul. 1, 2024, 14 pages.

*Primary Examiner* — Hicham Skhoun
(74) *Attorney, Agent, or Firm* — Trop, Pruner & Hu, P.C.

(57) ABSTRACT

Example implementations relate to deduplication operations in a storage system. An example includes receiving a data stream that includes multiple locality portions. The example also includes, upon determining that a first container index for a first portion has insufficient capacity to store metadata of a first set of new data units in the first portion, instantiating a first overflow container index associated with the first portion, and storing the metadata of the first set of new data units in the first overflow container index. The example also includes, upon determining that a second container index associated with a second portion has insufficient capacity to store metadata of a second set of new data units in the second portion, instantiating a second overflow container index associated with the second portion, and storing the metadata of the second set of new data units in the second overflow container index.

20 Claims, 15 Drawing Sheets

(56) References Cited

U.S. PATENT DOCUMENTS

2021/0232500 A1* 7/2021 Butt .................... G06F 12/0253
2025/0061090 A1* 2/2025 Khobragade ......... G06F 16/164

* cited by examiner

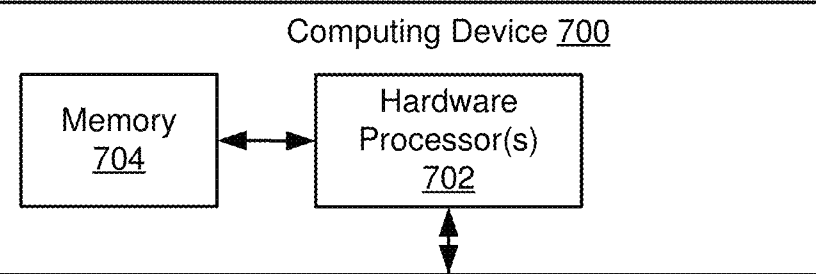

Machine Readable Storage Medium(s) 705

710

Receive a data stream to be stored in persistent storage of a deduplication storage system, where the data stream comprises a plurality of locality portions each comprising a plurality of data units

720

In response to a determination that a first container index associated with a first locality portion of the data stream has insufficient capacity to store metadata of a first set of new data units included in the first locality portion, instantiate a first overflow container index associated with the first locality portion

730

Store the metadata of the first set of new data units in the first overflow container index associated with the first locality portion

740

In response to a determination that a second container index associated with a second locality portion of the data stream has insufficient capacity to store metadata of a second set of new data units included in the second locality portion, instantiate a second overflow container index associated with the second locality portion

750

Store the metadata of the second set of new data units in the second overflow container index associated with the second locality portion

FIG. 7

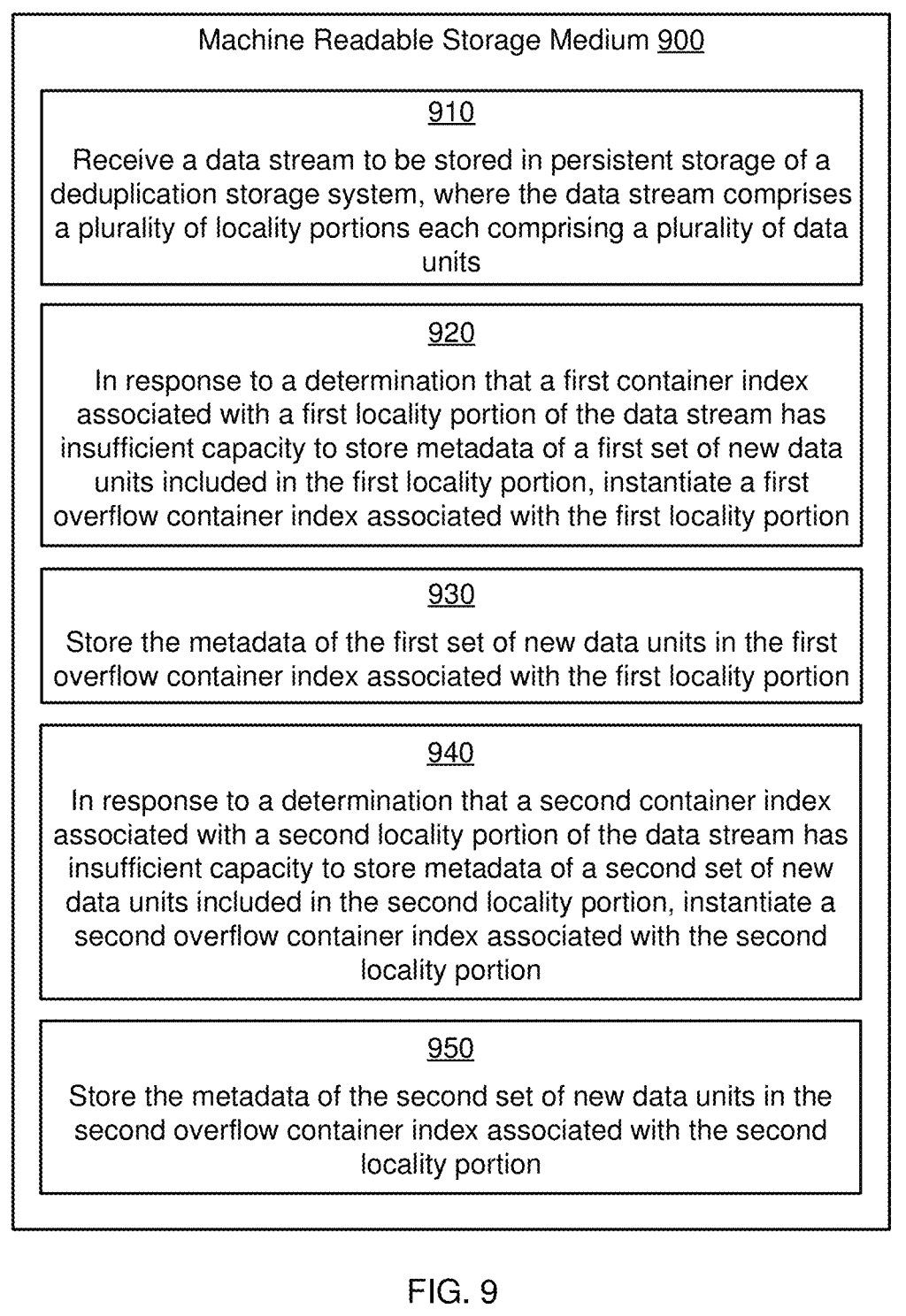

Machine Readable Storage Medium 900

910

Receive a data stream to be stored in persistent storage of a deduplication storage system, where the data stream comprises a plurality of locality portions each comprising a plurality of data units

920

In response to a determination that a first container index associated with a first locality portion of the data stream has insufficient capacity to store metadata of a first set of new data units included in the first locality portion, instantiate a first overflow container index associated with the first locality portion

930

Store the metadata of the first set of new data units in the first overflow container index associated with the first locality portion

940

In response to a determination that a second container index associated with a second locality portion of the data stream has insufficient capacity to store metadata of a second set of new data units included in the second locality portion, instantiate a second overflow container index associated with the second locality portion

950

Store the metadata of the second set of new data units in the second overflow container index associated with the second locality portion

FIG. 9

OVERFLOW CONTAINER INDEXES FOR A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIG. 7 is a schematic diagram of an example computing device, in accordance with some implementations.

FIG. 9 is a diagram of an example machine-readable medium storing instructions in accordance with some implementations.

Figure 1A:
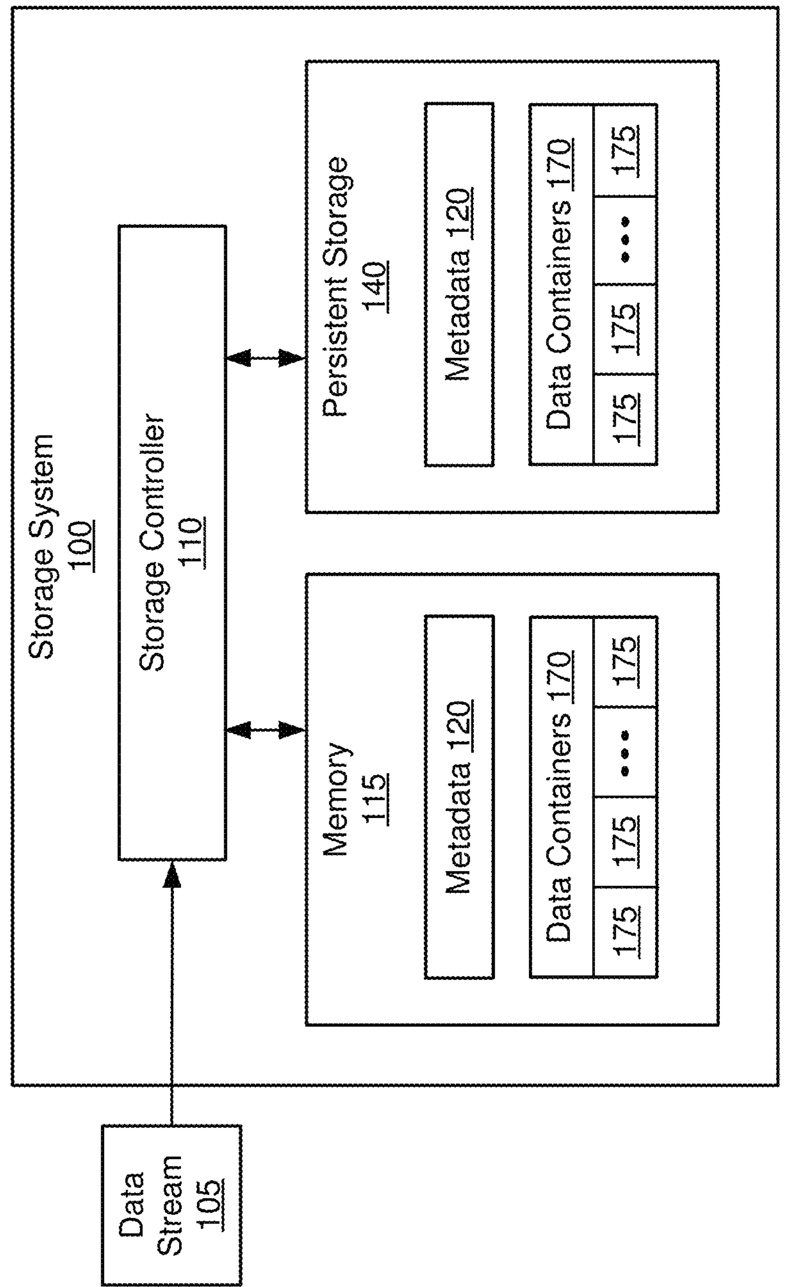
FIGS. 1A-1C are schematic diagrams of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream"). Further, in some examples, the storage system may backup at least a portion of the data stream in deduplicated form, to thereby reduce the amount of storage space occupied by storage of the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a storage system may use metadata structures for processing inbound data streams (e.g., backup items). For example, such metadata structures may include data recipes (also referred to herein as "manifests") that specify the order in which particular data units are received for each backup item. Further, such metadata structures may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the storage system may use the item metadata and the set of manifests to determine the received order of data units, and may thereby recreate the original data stream of the backup item. Accordingly, the set of manifests may be a representation of the original backup item. The manifests may include a sequence of records, with each record representing a particular set of data unit(s). The records of the manifest may include one or more fields that identify container indexes. The container indexes may be metadata structures that index (e.g., include storage information for) the data units. For example, a container index may include one or more metadata fields that specify location information (e.g., data containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical chunk is already stored in a container of the storage system. For example, the storage system may compare the fingerprint of the received data unit against the fingerprints in one or more container indexes. As used herein, the term "matching operation" may refer to an operation to compare fingerprints of a collection of multiple data units (e.g., from a particular backup data stream) against fingerprints stored in one or more container indexes. If no matching fingerprints are found in the searched container index(es), the received data unit may be added to a data container, and a metadata entry for the received data unit may be added to a container index corresponding to that container. However, if a matching fingerprint is found in a searched container index, it may be determined that a data unit identical to the received data unit is already stored in an existing data container. In response to this determination, the reference count of the corresponding entry may be incremented, and the received data unit is not stored in a data container (as it is already present in one of the data containers), thereby avoiding storing a duplicate data unit in the storage system.

In some examples, when processing an initial instance of a data stream (e.g., during the initial backup of a given backup item), a set of initial container indexes may be allocated to different localities (e.g., portions or segments) in the stream. Each initial container index may record metadata for the data units included in the locality portion that is associated with that initial container index. As used herein, the term "data localization" may refer to storing data and/or metadata for a given locality (also referred to herein as a "locality portion") in a single data object (or a set of associated data objects). Such data localization may allow the storage system to perform deduplication in a relatively efficient manner (e.g., in comparison to not using stream localization). For example, when receiving a set of data units in a particular locality portion of the stream, the storage system may perform deduplication of that set of data units by retrieving and reading a single container index that is associated with that locality portion. Accordingly, use of data localization may reduce the amount of metadata that has to be retrieved from storage and loaded into memory. In this manner, the performance impacts and/or financial costs associated with deduplication (e.g., storage access, network bandwidth, time delay, processing bandwidth, etc.) may be reduced.

In some examples, when processing the initial instance of the data stream, each initial container index may only be partially filled with metadata (e.g., to allow for future addition of new data units). Subsequently, when processing later instances of the data stream (e.g., for subsequent backups of the same backup item), the metadata for new data units that match a particular locality portion may be stored in the initial (partially-filled) container index that is allocated to that particular locality portion. Further, if a later instance of the data stream includes a new data unit that does not match any of the locality portions associated with the set of initial container indexes, the metadata for that new data unit may be stored in a new container index (referred to as a "sticky container index") that has available storage capacity and is associated with a new locality portion that is added to the data stream. Once the sticky container index is filled, another (new) sticky container index may be instantiated. Further, this new sticky container index may be associated with another (new) locality portion that is added to the data stream.

In some examples, once an initial container index is filled to a maximum level or threshold (i.e., when processing later instances of the data stream), that initial container index lacks the capacity to store any additional metadata for new data units in the locality portion associated with that initial container index. In such examples, the metadata for the new data unit may be stored in the sticky container index. Further, this process may be repeated for new data units in different locality portions, thereby causing the sticky container index to store metadata for data units in multiple locality portions. Therefore, in such examples, the sticky container index(es) may fail to provide data localization, and may thus result in relatively lower performance and/or higher financial costs to perform deduplication. For example, when receiving data units that are included in a particular locality portion, but those data units were previously indexed across multiple sticky container indexes associated with different locality portions, the storage system may have to identify and read these multiple sticky container indexes to perform deduplication of those data units. In particular, each sticky container index may have to be retrieved from storage and transferred accessed across a network. However, each sticky container index may only include a relatively small portion of the metadata that is actually used for the deduplication operation. Accordingly, in such examples, the need to use multiple sticky container indexes (for different locality portions) may result in a relatively large amount of metadata that has to be retrieved from storage and loaded into memory for the deduplication operation (e.g., in comparison to using a smaller number of container indexes that provide data localization), and may thereby reduce the performance and/or increase the financial costs associated with deduplication.

In accordance with some implementations of the present disclosure, a controller of a deduplication storage system may receive an initial instance of a data stream to be stored in persistent storage. The controller may generate a set of initial container indexes that are associated with different locality portions in the data stream, and may fill each initial container index with metadata for data units included in the locality portion that is associated with that initial container index. Accordingly, by completing filling each initial container index as it is initially generated, the total number of container indexes that are needed to store the stream metadata may be reduced (e.g., in comparison to only partially filling the initial container indexes when they are initially generated).

Further, when processing a later instance of the data stream, the controller may determine that a new data unit is mapped to a particular locality portion, and in response may instantiate an overflow container index that is associated with the particular locality portion. Subsequently, when that overflow container index has no available storage capacity (e.g., stores a specified number of metadata entries), the controller may instantiate another overflow container index that is associated with the particular locality portion. The initial container index may be linked or chained (e.g., via a pointer) to the overflow container index(es) that are associated with the particular locality portion. The controller may then use these linked container indexes to perform deduplication of received data units that are included in the particular locality portion. In this manner, the linked container indexes may provide data localization of metadata used to perform data deduplication, thereby reducing the performance impacts and/or financial costs associated with deduplication. For example, when receiving a set of data units in a particular locality portion of the stream, the storage system may perform deduplication of that set of data units by retrieving and reading a relatively small number of linked container indexes that are associated with that locality portion. Accordingly, use of linked container indexes may reduce the amount of metadata that has to be retrieved from storage and loaded into memory (i.e., in contrast to retrieving and loading a relatively large number of sticky container indexes associated with different locality portions). The disclosed technique for using linked container indexes is discussed further below with reference to FIGS. 1A-9.

Figure 1B:
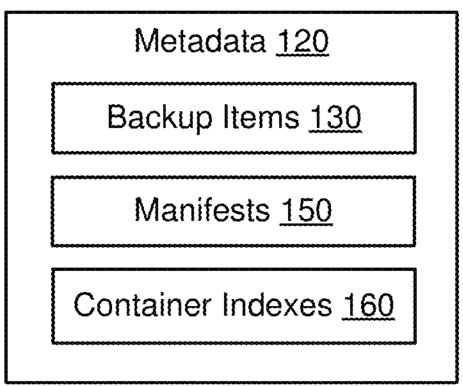
Figure 1C:
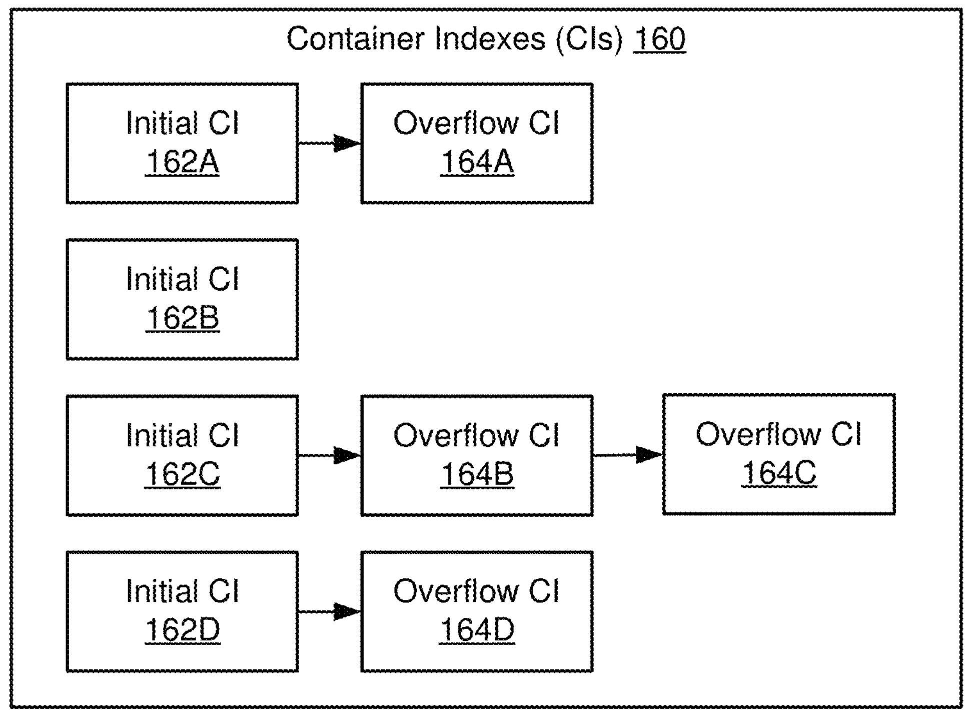

FIGS. 1A-1C—Example Storage System

FIG. 1A shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1A, the memory 115 and the persistent storage 140 may store metadata 120 and data containers 170. Each data container 170 may include multiple stored data units 175. In some examples, copies of the metadata 120 and the data containers 170 may be transferred between the memory 115 and persistent storage 140 (e.g., via read and write input/output (I/O) operations).

In some implementations, the storage system 100 may perform deduplication of stored data. For example, the storage controller 110 may receive an inbound data stream 105 (also referred to herein as a "backup item") including multiple data units. In some examples, each instance of a received data stream 105 may represent a unique backup of a collection of data. The storage controller 110 may store at least one copy of each data unit 175 in a data container 170 (e.g., by appending the data units 175 to the end of the data container 170). Further, the storage controller 110 may generate various data structures of metadata 120 for processing and deduplicating the stored data. For example, as shown in FIG. 1B, the metadata 120 may include backup items 130, manifests 150, and container indexes 160 (described below).

In some implementations, the storage controller 110 may generate a fingerprint for each received data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints in at least one container index 160. If a match is identified, then the storage controller 110 may determine that a duplicate of the incoming data unit is already stored by the storage system 100. The storage controller 110 may then store references to the previous data unit, instead of storing the duplicate incoming data unit. The process of comparing fingerprints of one or more received data units against fingerprints of one or more container indexes 160 may be referred to herein as a "matching operation."

In some implementations, prior to attempting to perform matching operations for received data units, the storage controller 110 may identify a particular container index 160 (referred to herein as the "candidate" container index) to use in matching operations for received data unit(s). In some examples, the candidate container index may be identified using a data structure (referred to herein as a "sparse index") that maps a relatively small subset of fingerprints (referred to herein as "hook points") to corresponding container indexes. For example, the hook points of incoming data units may be compared to the hook points in the sparse index, and the container index with the highest number of matching hook points may be identified as the candidate container index. Alternatively, in some implementations, the sparse index may be used to identify a "candidate list" including multiple container indexes (e.g., five container indexes) that have the highest numbers of matching hook points. In such implementations, the candidate list may be used in matching operations for received data unit(s). In some implementations, the sparse index may contain entries for a subset of fingerprints defined by a sparse fingerprint condition. As used herein, the term "hook points" refers to the subset of fingerprints that meet the sparse fingerprint condition. In some examples, the sparse fingerprint condition may be a condition that is met by a relatively small number of all of the possible fingerprints. For example, the sparse fingerprint condition may be whether a given fingerprint (e.g., in a binary representation) includes a particular bit pattern at a particular offset.

In some implementations, the storage controller 110 may generate a backup item 130 to represent each received backup (e.g., a data stream 105) in a deduplicated form. Each backup item 130 may include identifiers for a set of manifests 150, and may indicate the sequential order of the set of manifests 150. The manifests 150 record the order in which the data units were received. Further, the manifests 150 may include a pointer or other information indicating the container index 160 that indexes each data unit. In some implementations, the container index 160 may indicate the location in which the data unit is stored. For example, the container index 160 may include information specifying that the data unit is stored at a particular offset in an entity, and that the entity is stored at a particular offset in a data container 170. Further, the container index 160 may include reference counts that indicate the number of manifests 150 that reference each data unit.

In some implementations, the storage controller 110 may receive a read request to access the stored data, and in response may access the backup item 130 and manifests 150 to determine the sequence of data units that made up the original data. The storage controller 110 may then use pointer data included in a manifest 150 to identify the container indexes 160 that index the data units. Further, the storage controller 110 may use information included in the identified container indexes 160 (and information included in the manifest 150) to determine the locations that store the data units (e.g., data container 170, offsets, etc.), and may then read the data units from the determined locations.

Referring now to FIG. 1C, the container indexes (CIs) 160 may include a set of initial CIs 162A-162D (also referred to herein as "initial CIs 162"). In some implementations, the storage controller 110 may generate the initial CIs 162 when processing an initial instance of a data stream 105 (e.g., during the initial backup of a collection of data). The storage controller 110 may allocate or assign each initial CI 162 to a different locality portion in the data stream 105. Further, the storage controller 110 may record, in each initial CI 162, metadata for the data units included in the locality portion associated with that initial CI 162. In some implementations, the storage controller 110 may fill each initial CI 162 when processing the initial instance of the data stream 105 (e.g., by populating a maximum number of entries in the initial CI 162). In some implementations, the initial CIs 162 may be filled up to a maximum storage capacity. In other implementations, the initial CIs 162 may be filled up to a threshold level that is less than the maximum storage capacity. Other implementations are possible.

In some implementations, when processing later instances of the data stream 105, the storage controller 110 may generate a set of overflow CIs 164A-164D (also referred to herein as "overflow CIs 164") to record metadata for new data units (i.e., data units that are not already recorded in an existing CI 160). For example, the storage controller 110 receives a data unit included in a locality portion "C" of a subsequent data stream 105, and determines that the initial CI 162C is associated with (e.g., is mapped to) the locality portion "C." Further, because the initial CI 162C has insufficient storage capacity to store the metadata for new data units, the storage controller 110 instantiates the overflow CI 164B that is associated with the locality portion "C" and/or the initial CI 162C. As used herein, a CI that has "insufficient storage capacity" to store a new entry refers to a CI that already stores at least a specified amount of metadata (or a specified number of metadata entries). For example, a CI that has insufficient storage capacity to store a new entry may already be filled to a maximum storage capacity (i.e., is already full). In another example, a CI that has insufficient storage capacity to store a new entry may be filled to a threshold level is less than the maximum capacity, but which triggers or otherwise causes the instantiation of an overflow CI to store the new metadata entry.

In some implementations, after instantiating the overflow CI 164B, the storage controller 110 populates the initial CI 162C with a pointer or link to the overflow CI 164B. Subsequently, when the overflow CI 164B has insufficient storage capacity to store additional metadata entries, the storage controller 110 instantiates another overflow CI 164C that is associated with the locality portion "C" and/or the initial CI 162C. In some examples, the storage controller 110 populates the overflow CI 164B (and/or the initial CI 162C) with a pointer or link to the overflow CI 164C. In this manner, one or more overflow CIs 164 may be associated (e.g., via one or more links or pointers) with a particular locality portion (and/or the initial CI 162 associated that locality portion). The storage controller 110 may then use these linked CIs 160 to perform deduplication of received data units that are included in a given locality portion of the data stream 105. For example, assume that the initial CI 162C is identified as the candidate CI for a particular data unit, and in response the initial CI 162C is loaded into memory (e.g., from persistent storage) to perform a matching operation for the particular data unit. Further, in some examples, a pointer (or pointers) may be used to identify the overflow CIs that are associated with the initial CI 162C (i.e., overflow CI 164B and overflow CI 164C), and the identified overflow CIs may also be loaded into memory for the matching operation for the particular data unit. In this manner, the linked CIs 160 may provide data localization of metadata used to perform data deduplication. An example process for using linked container indexes is discussed further below with reference to FIGS. 3-4E.

In some implementations, if a later instance of the data stream 105 includes a new data unit that does not match any of the locality portions associated with the initial CIs (e.g., initial 162A-162D shown in FIG. 1C), the metadata for that new data unit may be stored in a sticky container index (not shown in FIG. 1C) that has available storage capacity and is associated with a new locality portion that is added to the data stream 105. Once the sticky container index is filled, another (new) sticky container index may be instantiated. Further, this new sticky container index may be associated with another (new) locality portion that is added to the data stream 105.

Figure 2:
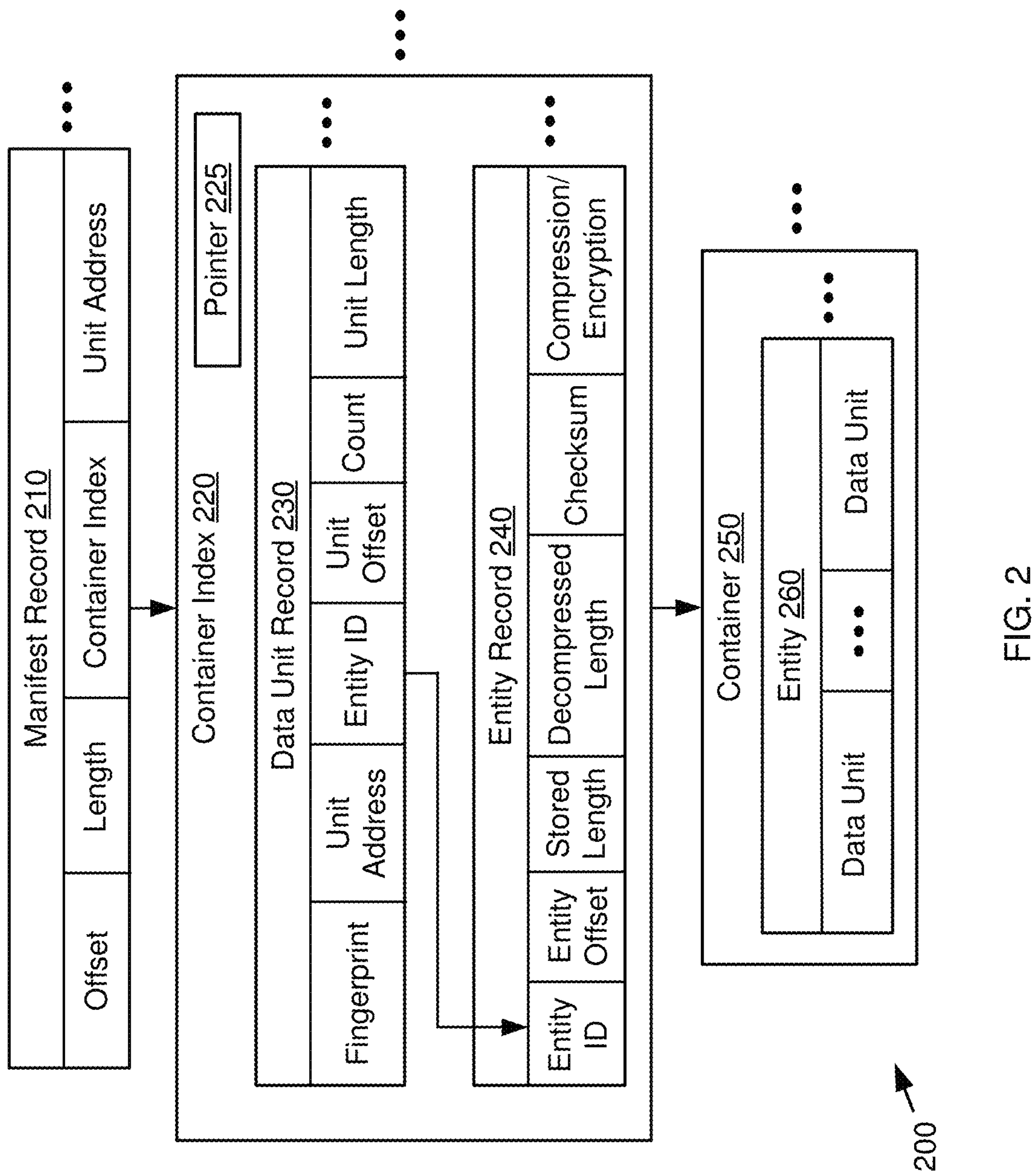
FIG. 2 is an illustration of example data structures, in accordance with some implementations.

FIG. 2—Example Data Structures

FIG. 2 shows example data structures 200 used in deduplication, in accordance with some implementations. As shown, the data structures 200 may include item metadata 202, a manifest 203, a container index 220, and a data container 250. In some examples, the item metadata 202, the manifest 203, the container index 220, and the data container 250 may correspond generally to example implementations of a backup item 130, a manifest 150, a container index 160, and a data container 170 (shown in FIGS. 1A-1B), respectively. In some examples, the data structures 200 may be generated and/or managed by the storage controller 110 (shown in FIG. 1).

In some implementations, the item metadata 202 may include multiple manifests identifiers 205. Each manifests identifier 205 may identify a different manifest 203. In some implementations, the manifests identifiers 205 may be arranged in a stream order (i.e., based on the order of receipt of the data units represented by the identified manifests 203).

Although one of each is shown for simplicity of illustration in FIG. 2, data structures 200 may include a plurality of instances of item metadata 202, each including or pointing to one or more manifests 203. In such examples, data structures 200 may include a plurality of manifests 203. The manifests 203 may reference a plurality of container indexes 220, each corresponding to one of a plurality of data containers 250. Each container index 220 may comprise one or a plurality of data unit records 230, and one or a plurality of entity records 240.

Further, in some implementations, a container index 220 may include pointer data 225. The pointer data 225 may be a data structure to store information regarding one or more container indexes that are linked to the container index 220, and/or information regarding a locality portion associated with the container index 220. For example, referring to FIG. 1C, the initial CI 162C may include pointer data 225 that indicates a relationship or link (e.g., a parent-child link) to the overflow CI 164B. Further, the overflow CI 164B may include pointer data 225 that indicates a first link (e.g., a child-parent link) to the initial CI 162C, and also indicates a second link (e.g., a parent-child link) to the overflow CI 164C. In another example, the initial CI 162C, the overflow CI 164B, and the overflow CI 164C may each include pointer data 225 that indicates an association or mapping to the locality portion "C" of a data stream. Other implementations are possible.

As shown in FIG. 2, in some examples, each manifest 203 may include one or more manifest records 210. Each manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, a unit length, and an arrival time. The reference count value may indicate the number of manifest records 210 that reference the data unit record 230. In some implementations, the arrival time (e.g., stored in the data unit record 230) may record the data and time that the data unit is received by the storage system. In other implementations, the arrival time may indicate the data and time that the data unit record 230 was created to record information regarding the received data unit.

In some implementations, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

FIGS. 3 and 4A-4E—Example Process for Generating Linked Container Indexes

Figure 3:
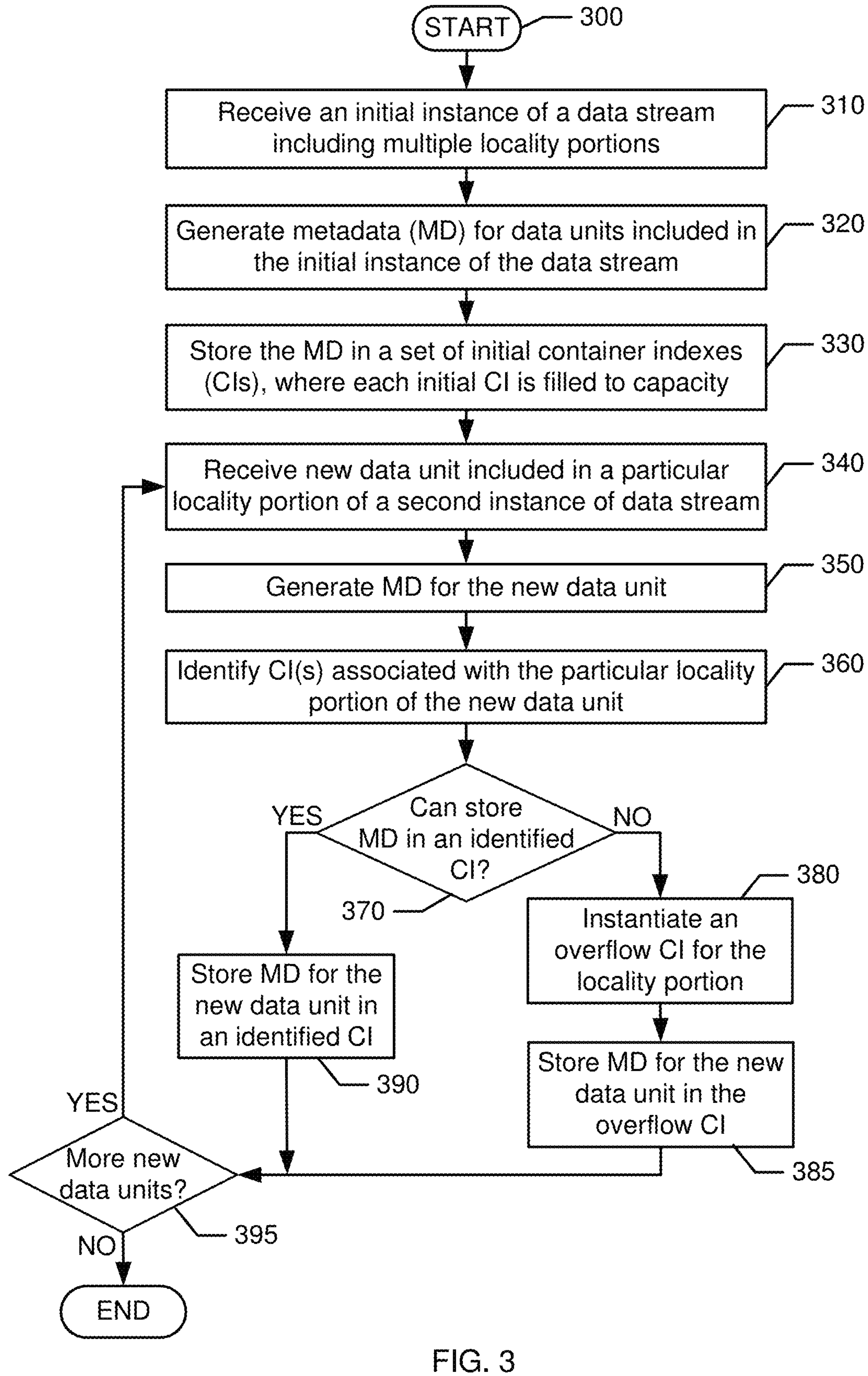
FIG. 3 is an illustration of an example process, in accordance with some implementations.

FIG. 3 shows an example process 300 for generating linked container indexes, in accordance with some implementations. For the sake of illustration, details of the process 300 may be described below with reference to FIGS. 4A-4E, which show examples in accordance with some implementations. However, other implementations are also possible. In some examples, the process 300 may be performed using the storage controller 110 (shown in FIG. 1A). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 310 may include receiving an initial instance of a data stream including multiple locality portions. Block 320 may include generating metadata (MD) for data units included in the initial instance of the data stream. Block 330 may include storing the metadata in a set of initial container indexes (CIs), where each initial CI is filled to capacity.

Figure 4A:
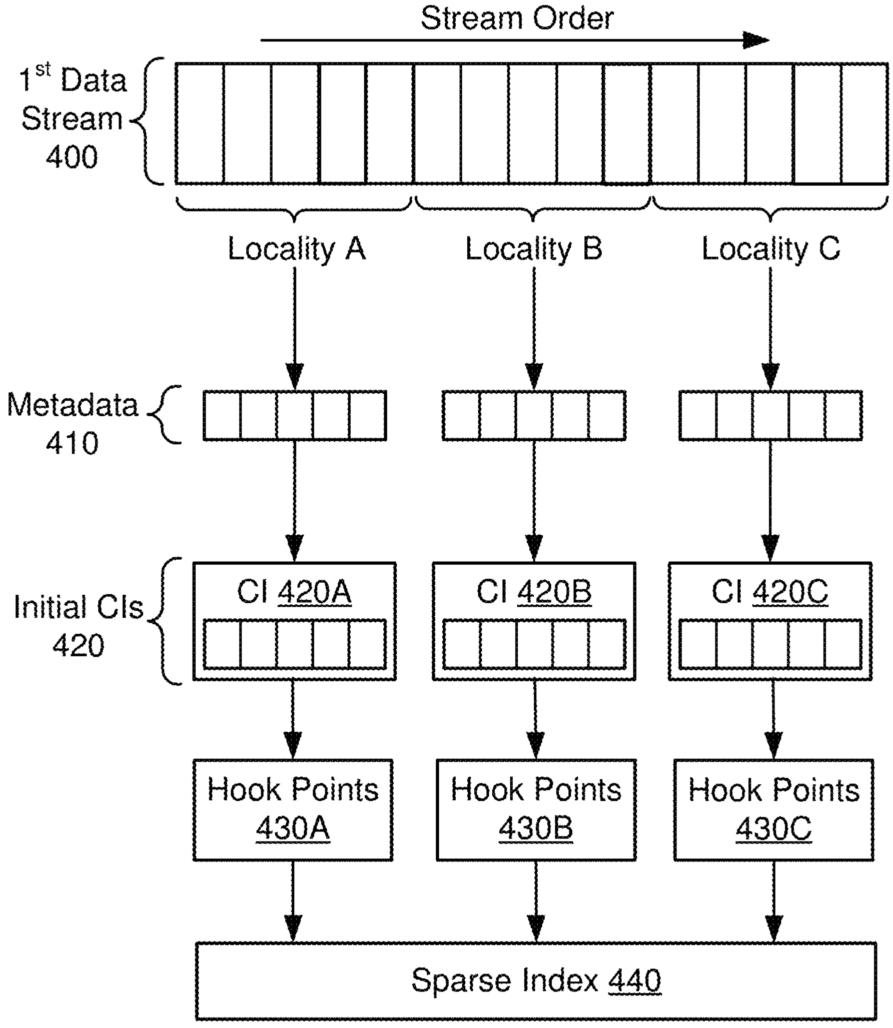
FIGS. 4A-4E are illustrations of example operations, in accordance with some implementations.

For example, referring to FIG. 4A, a controller (e.g., storage controller 110 shown in FIG. 1) receives a first data stream 400 to be stored in persistent storage. The first data stream 400 may be an initial instance of a data stream (e.g., during the initial backup of a collection of data). As shown in FIG. 4A, the first data stream 400 includes multiple data units that are divided into multiple locality portions (e.g., localities "A," "B," and "C"). The controller generates metadata 410 for each received data unit (e.g., a fingerprint, storage address, a reference count value, length, arrival time, and so forth), and records the metadata 410 in a set of initial CIs 420A-420C (also referred to as initial CIs 420). In some implementations, each initial CI 420 is associated or allocated to a different locality portion, and may record the metadata 410 for the subset of data units included in its associated locality portion. For example, the initial CI 420A may record the metadata 410 for data units in locality portion "A," the initial CI 420B may record the metadata 410 for data units in locality portion "B," and so forth.

Further, in some implementations, the controller may identify different sets of hook points 430A-430C (also referred to as hook points 430) from the respective initial CIs 420A-420C. The hook points 430 may be a relatively small subset of fingerprints (e.g., defined by a sparse fingerprint condition) that are included in the container indexes 420. The controller may populate a sparse index 440 with entries mapping the sets of hook points 430A-430C to their respective initial CIs 420A-420C. In some implementations, the controller may use the sparse index 440 to identify one or more candidate CIs 160 for matching operations (e.g., CIs 160 that are predicted to be likely to include stored fingerprints that match the fingerprints of received data units). An example process for identifying the candidate CI(s) 160 is described below with reference to FIG. 5

Referring again to FIG. 3, block 340 may include receiving a new data unit included in a particular locality portion of a second instance of data stream. Block 350 may include generating metadata for the new data unit. Block 360 may include identifying a CI (or multiple CIs) associated with the particular locality portion of the new data unit.

Figure 4B:
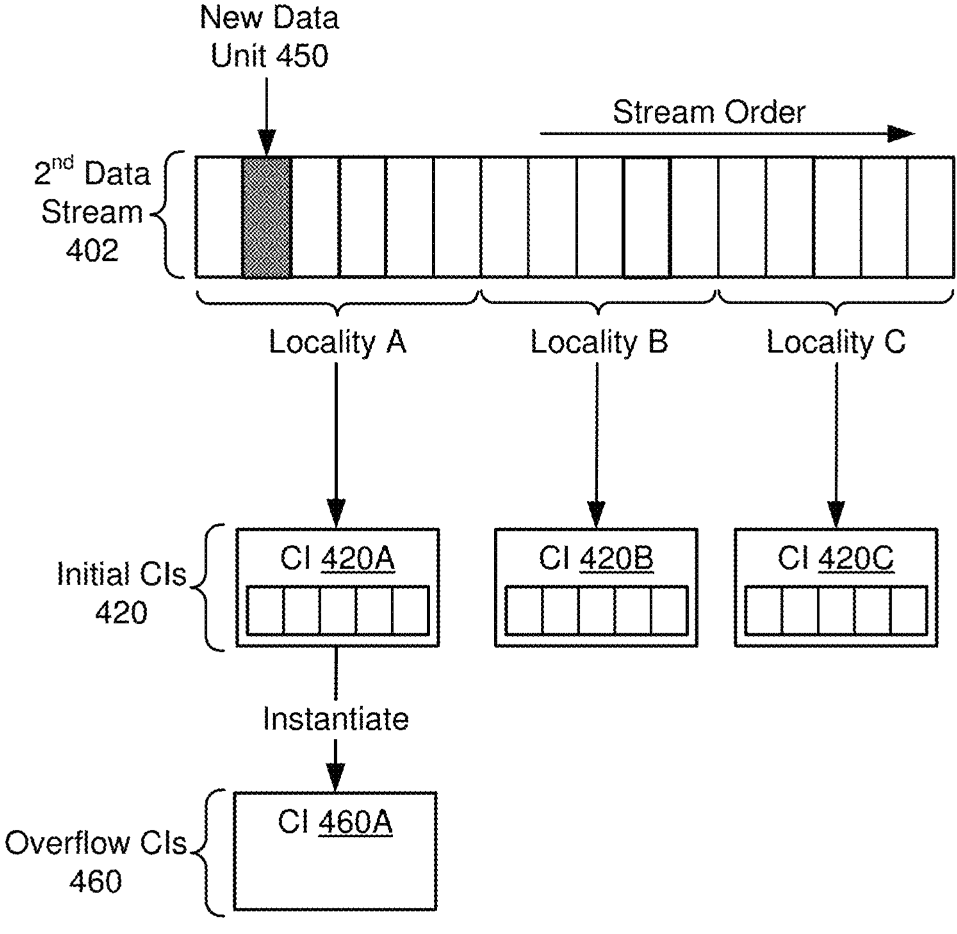

For example, referring to FIG. 4B, the controller receives a second data stream 402, and generates metadata (e.g., fingerprints) for the data units in the second data stream 402. The second data stream 402 may be a second (or later) instance of a data stream (e.g., during a subsequent backup of the collection of data). The controller determines that the second data stream 402 includes a new data unit 450 that was not included in the first data stream 400, and determines that the new data unit 450 is included locality portion "A" of the second data stream 402. As such, the new data unit 450 may represent a data addition that was made to a data collection between the receipt time of the first data stream 400 and the receipt time of the second data stream 402.

In some implementations, the controller may compare hook points of data units in the second data stream 402 to hook points in a sparse index (e.g., sparse index 440 shown in FIG. 4A). The controller may identify a particular CI (e.g., initial CI 420A) that has the highest number of hook points that match the hook points in the received data (also referred to as the highest "match score") is selected as the candidate CI (also referred to as the "best matching" CI). In some examples, the controller may then determine that the new data unit 450 is located in locality portion "A" (i.e., the locality portion associated with the candidate CI 420A). Further, the controller may perform matching operations to match fingerprints of the data units (in the second data stream 402) to the fingerprints in the candidate CI 420A. If a match is found for a data unit, the controller may determine that the data unit is a duplicate of a data unit that is already stored in persistent storage. Otherwise, if a match is not found for a particular data unit, the controller may determine that the particular data unit (e.g., new data unit 450) is not already stored in the persistent storage.

Referring again to FIG. 3, decision block 370 may include determining whether the metadata can be stored in an identified CI. If so ("YES"), then the process 300 may continue at block 390, including storing the metadata for the new data unit in the identified CI. Otherwise, it is determined at decision block 370 that the metadata cannot be stored in an identified CI ("NO"), the process 300 may continue at block 380, including instantiating an overflow CI for the particular locality portion. Block 385 may include storing the metadata for the new data unit in the overflow CI. After either block 385 or block 390, the process 300 may continue at decision block 395, including determining whether there are more data units remaining to be processed in the second instance of the data stream. If so ("YES"), the process 300 may return to block 340 (i.e., to receive and process another data unit included in the second instance of the data stream). Otherwise, if it is determined at decision block 395 that there are no more data units remaining to be processed in the second instance of the data stream ("NO"), the process 300 may be completed.

Figure 4C:
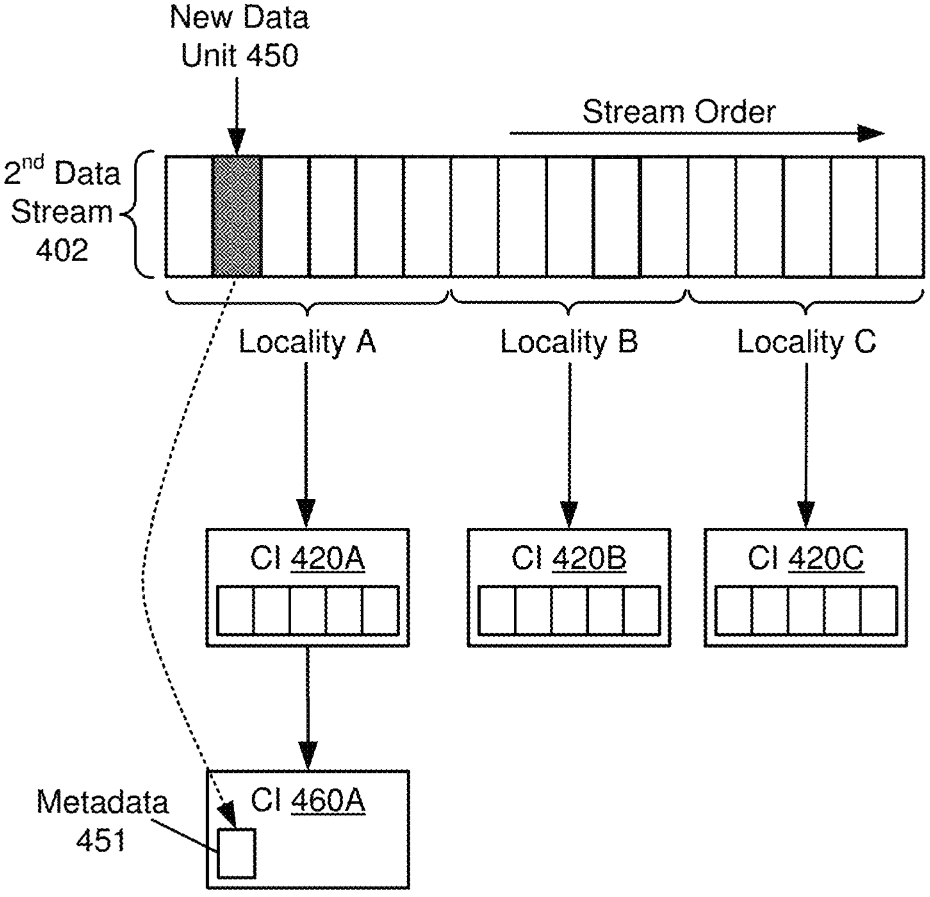

For example, referring to FIGS. 4B-4C, the controller determines that the initial CI 420A (i.e., the CI associated with the locality portion "A" that includes the new data unit 450) has insufficient storage capacity to store a new metadata entry (e.g., already stores a particular number of metadata entries). In response to this determination, the controller instantiates an overflow CI 460A that is associated with the initial CI 420A. In some implementations, the overflow CI 460A is configured to store metadata only for new data units (e.g., new data unit 450) that are included in locality portion "A" of the received data stream(s). As shown in FIG. 4C, the controller generates the metadata 451 for the new data unit 450, and then loads the metadata 451 in the overflow CI 460A.

Figure 4D:
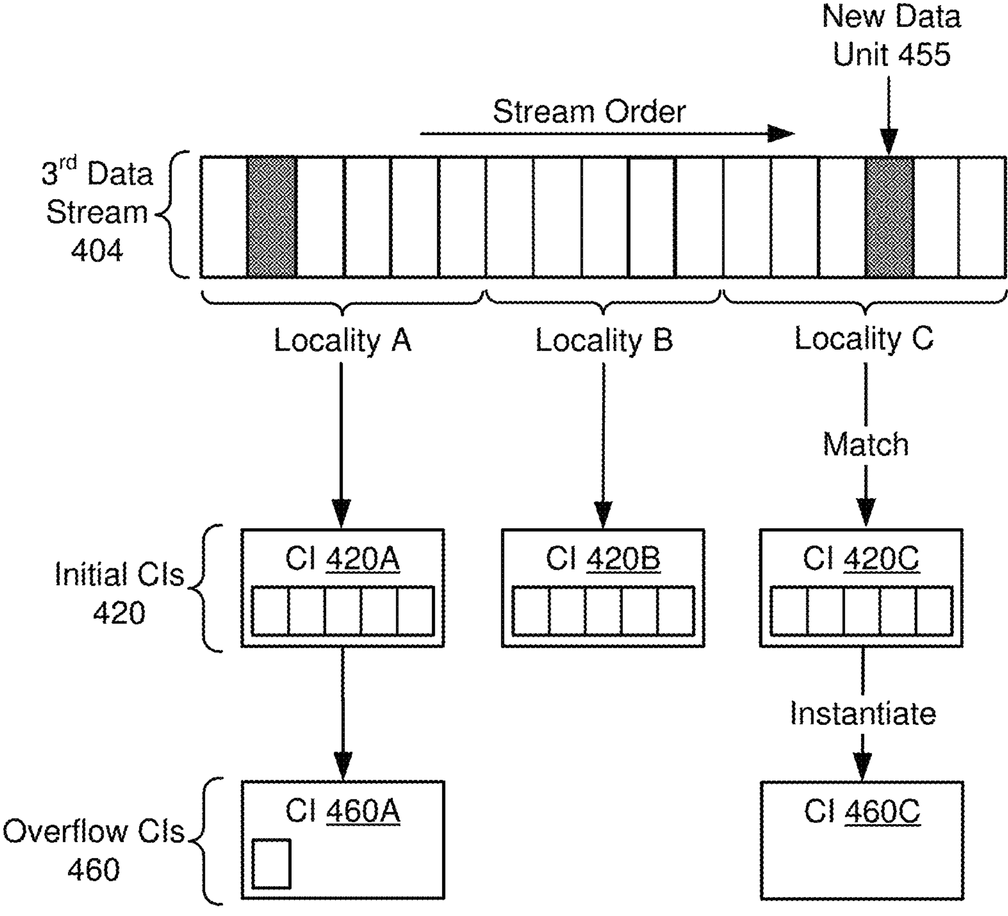
Figure 4E:
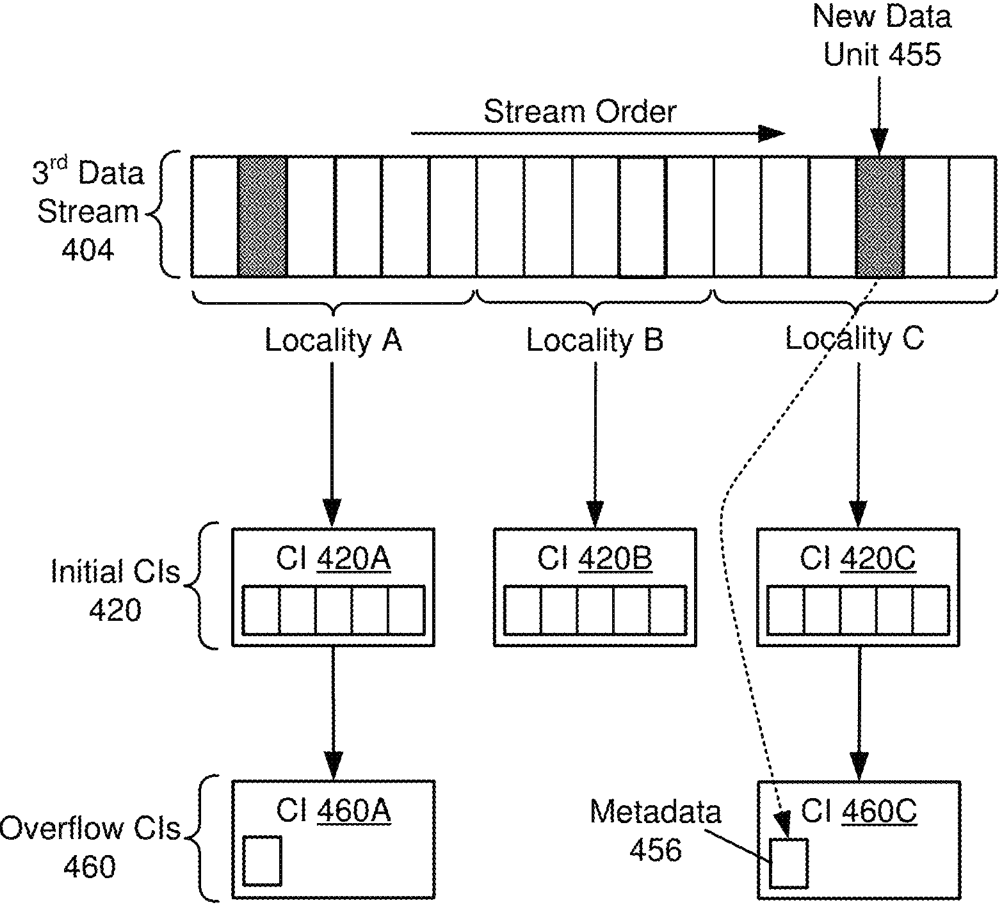

In another example, referring to FIGS. 4D-4E, the controller receives a third data stream 404, determines that the third data stream 404 includes a new data unit 455, and determines that the new data unit 455 is included locality portion "C" of the third data stream 404. Further, the controller determines that the initial CI 420C (i.e., the CI associated with the locality portion "C" that includes the new data unit 455) has no available storage capacity, and in response instantiates an overflow CI 460C that is associated with the initial CI 420C. As shown in FIG. 4E, the controller generates the metadata 456 for the new data unit 455, and then loads the metadata 456 in the overflow CI 460C.

Figure 5A:
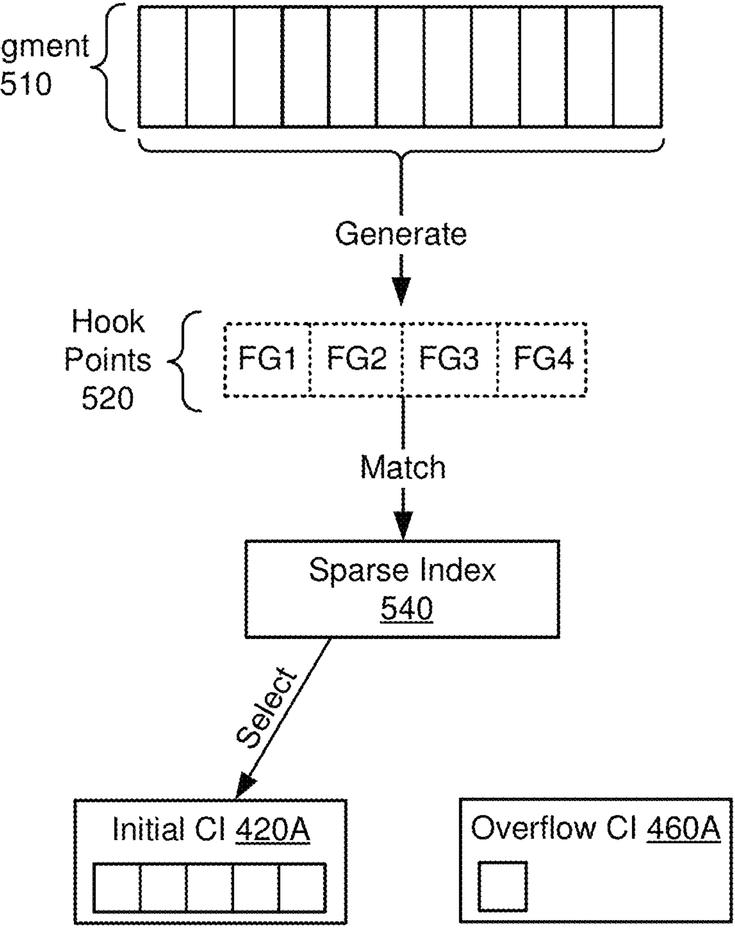
FIGS. 5A-5B are illustrations of example operations, in accordance with some implementations.
Figure 5B:
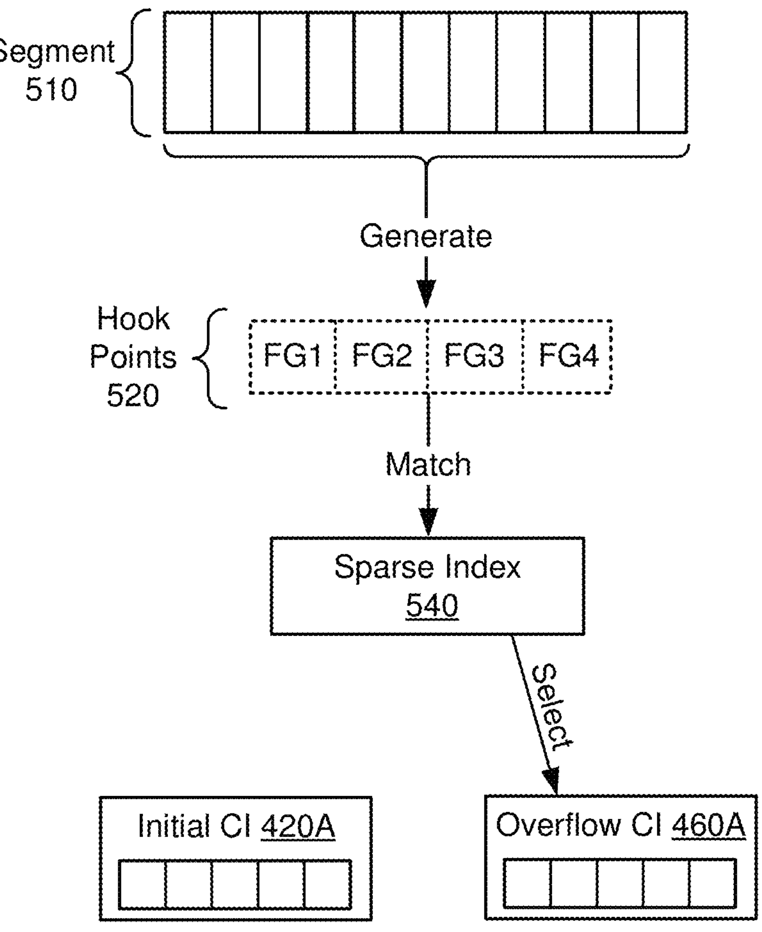

FIGS. 5A-5B—Example Operations for Selecting Container Indexes

FIGS. 5A-5B show example operations for selecting container indexes. In particular, FIG. 5A illustrates a segment 510 (e.g., a portion of a data stream) that is received by a controller (e.g., by storage controller 110 shown in FIG. 1A) at a first point in time. In particular, at the first point in time, the initial CI 420A has no available storage capacity (i.e., already stores a maximum number of five metadata entries), and the overflow CI 460A has available storage capacity (e.g., can store up to three metadata entries, but currently stores a single metadata entry). Assume that the initial CI 420A and the overflow CI 460A are associated with each other, and are both configured to store metadata only for data units included in locality portion "A" of received data stream(s).

In some implementations, the controller may generate a set of hook points 520 based on the segment 510. The hook points 520 may be a relatively small subset of fingerprints (e.g., defined by a sparse fingerprint condition) that are generated from data units in the segment 510. The controller may compare the hook points 520 to a sparse index 540 that includes multiple entries that map different sets of hook points to different CIs. In some implementations, the CI that has the highest match score (i.e., the highest number of hook points in the sparse index 540 that match the hook points in the received data) is selected as the candidate CI. Assume that, at the first point in time illustrated in FIG. 5A, the sparse index 540 indicates that the initial CI 420A has a higher match score (with respect to the hook points 520) than the overflow CI 460A. Accordingly, at the first point in time, the initial CI 420A is selected as the candidate (i.e., best matching) CI for the segment 510. Further, the initial CI 420A may be used to perform a matching operation for a new data unit in the segment 510.

Referring now to FIG. 5B, the segment 510 is again received at a second point in time. Note, at the second point in time, both the initial CI 420A and the overflow CI 460A are full. The controller again generates the hook points 520 based on the segment 510, and compares the hook points 520 to the sparse index 540.

Assume that, at the second point in time illustrated in FIG. 5B, the sparse index 540 indicates that the overflow CI 460A has a higher match score than the initial CI 420A. Accordingly, at the second point in time, the overflow CI 460A is selected as the best matching CI for the segment 510. Further, the overflow CI 460A may be used to perform a matching operation for a new data unit in the segment 510.

As shown in FIGS. 5A-5B, the best matching CI for a given locality portion may change over time. For example, as an overflow CI becomes more populated with metadata over time, the best matching CI for the hook points in the received data may shift from an initial CI to the overflow CI, from one overflow CI to another overflow CI, and so forth. Further, as an older CI become depopulated (e.g., due to deletion of older data units during data housekeeping), the match score with that CI may be reduced, thereby causing a different CI to be selected as the best matching CI.

In some implementations, after selecting a particular CI as the best matching CI, the controller may use the best matching CI to perform a matching operation for a new data unit. For example, referring to FIG. 5A, the controller may use the initial CI 420A (selected as the best matching CI in FIG. 5A) to perform the matching operation for the new data unit in the segment 510. However, other implementations are possible. For example, in the example shown in FIG. 5A, after selecting the initial CI 420A as the best matching CI, the controller may use the associated overflow CI 460A (i.e., the overflow CI for the initial CI 420A) to perform the matching operation for the new data unit in the segment 510. In another example, the controller may use both the initial CI 420A and the associated overflow CI 460A to perform the matching operation for the new data unit in the segment 510. Further, for an example in which the initial CI 420A is linked with a chain of multiple overflow CIs (not shown in FIGS. 5A-5B), the controller may select a subset of the linked CIs (e.g., a set of five linked CIs that were most recently updated) to perform the matching operation for the new data unit in the segment 510.

Figure 6:
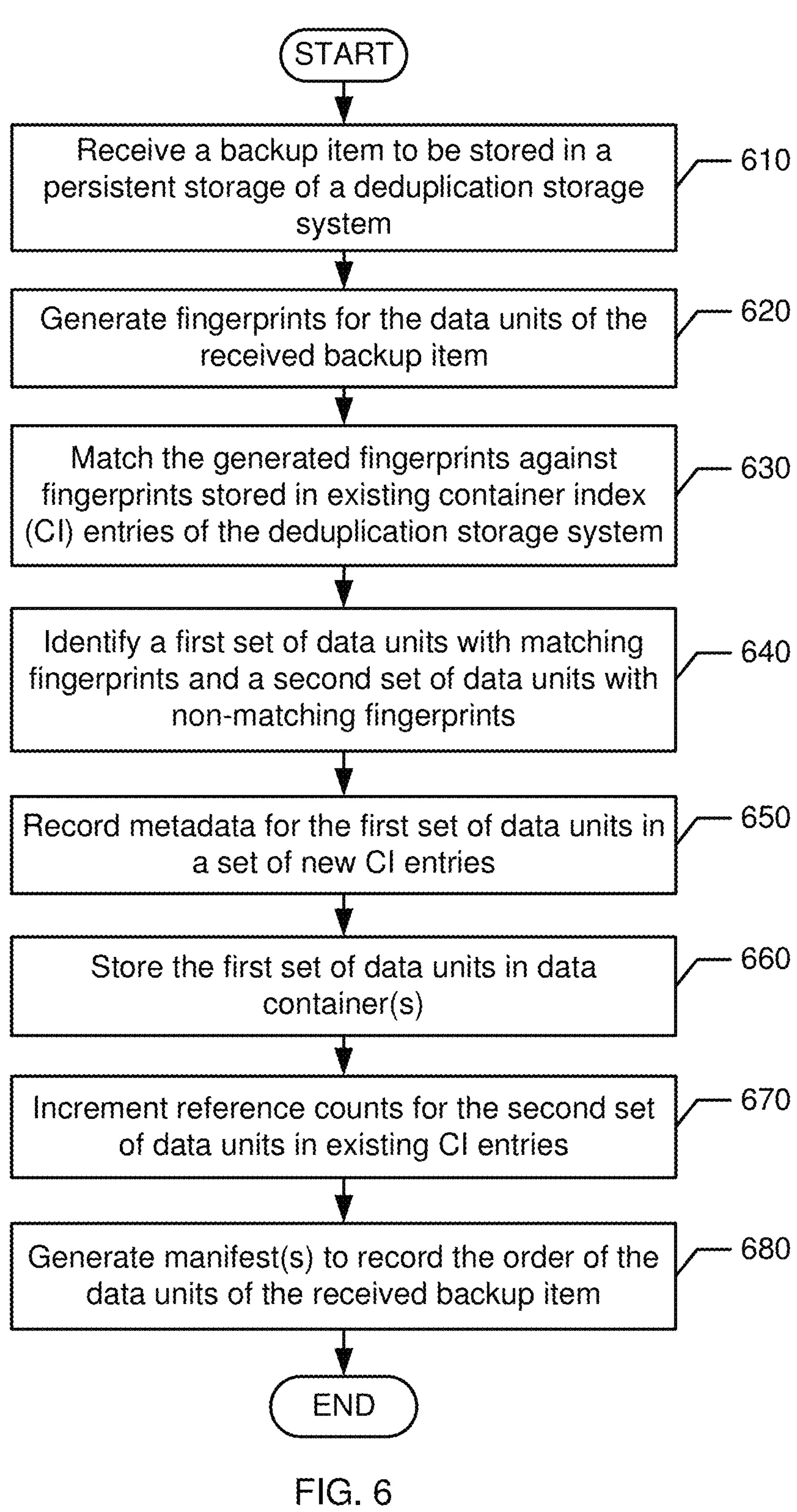
FIG. 6 is an illustration of an example process, in accordance with some implementations.

FIG. 6—Example Process for Generating Metadata

FIG. 6 shows an example process 600 for generating metadata, in accordance with some implementations. For the sake of illustration, details of the process 600 may be described below with reference to FIGS. 1A-1C, which show examples in accordance with some implementations. However, other implementations are also possible. In some examples, the process 600 may be performed using the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 610 may include receiving a backup item to be stored in a persistent storage of a deduplication storage system. Block 620 may include generating fingerprints for the data units of the received backup item. Block 630 may include matching the generated fingerprints against fingerprints stored in existing container index (CI) entries of the deduplication storage system. Block 640 may include identifying a first set of data units with matching fingerprints and a second set of data units with non-matching fingerprints.

Block 650 may include recording metadata for the first set of data units in a set of new CI entries. Block 660 may include storing the first set of data units in one or more data containers. Block 670 may include incrementing reference counts for the second set of data units in existing CI entries. Block 680 may include generating one or more manifests to record the order of the data units of the received backup item.

For example, referring to FIG. 1A, the storage controller 110 receives a backup item (e.g., data stream 105) to be stored in the deduplication storage system 100, and generates fingerprints for the data units in the received backup item. The storage controller 110 compares the generated fingerprints to the fingerprints included in container indexes 160. If a match is identified for a data unit, then the storage controller 110 determines that a duplicate of the data unit is already stored by the storage system 100. In response to this determination, the storage controller 110 stores a reference to the previous data unit (e.g., in a manifest 150) in deduplicated form. Otherwise, if a match is not identified for a data unit, then the storage controller 110 stores the data unit in a data container 170, and adds an entry for the data unit to a container index 160 corresponding to that data container 170. In some implementations, the storage controller 110 records the order in which data units are received in one or more manifests 150.

FIG. 7—Example Computing Device

FIG. 7 shows a schematic diagram of an example computing device 700. In some examples, the computing device 700 may correspond generally to some or all of the storage system 100 (shown in FIG. 1A). As shown, the computing device 700 may include at least one hardware processor 702, a memory 704, and at least one machine-readable storage medium 705 including instructions 710-750. The at least one machine-readable storage medium 705 may be a non-transitory storage medium. The instructions 710-750 may be executed by the at least one hardware processor 702, or by at least one processing engine included in the at least one hardware processor 702.

Instruction 710 may be executed to receive a data stream to be stored in persistent storage of a deduplication storage system, where the data stream comprises a plurality of locality portions each comprising a plurality of data units. Instruction 720 may be executed to, in response to a determination that a first container index associated with a first locality portion of the data stream has insufficient capacity to store metadata of a first set of new data units included in the first locality portion, instantiate a first overflow container index associated with the first locality portion. Instruction 730 may be executed to store the metadata of the first set of new data units in the first overflow container index associated with the first locality portion.

Instruction 740 may be executed to, in response to a determination that a second container index associated with a second locality portion of the data stream has insufficient capacity to store metadata of a second set of new data units included in the second locality portion, instantiate a second overflow container index associated with the second locality portion. Instruction 750 may be executed to store the metadata of the second set of new data units in the second overflow container index associated with the second locality portion.

For example, referring to FIGS. 4B-4C, a controller (e.g., storage controller 110 shown in FIG. 1) receives a second data stream 402, and generates metadata (e.g., fingerprints) for the data units in the second data stream 402. The controller determines that the second data stream 402 includes a new data unit 450 that was not included in the first data stream 400, and determines that the new data unit 450 is included locality portion "A" of the second data stream 402. The controller determines that the initial CI 420A (i.e., the CI associated with the locality portion "A" that includes the new data unit 450) has insufficient storage capacity to store a new metadata entry for the new data unit 450 (e.g., already stores a specified number of metadata entries, is full, and the like). In response, the controller instantiates an overflow CI 460A that is associated with the initial CI 420A. In some implementations, the overflow CI 460A is configured to store metadata only for new data units (e.g., new data unit 450) that are included in locality portion "A" of the received data stream(s). As shown in FIG. 4C, the controller generates the metadata 451 for the new data unit 450, and then stores the metadata 451 in the overflow CI 460A.

Figure 8:
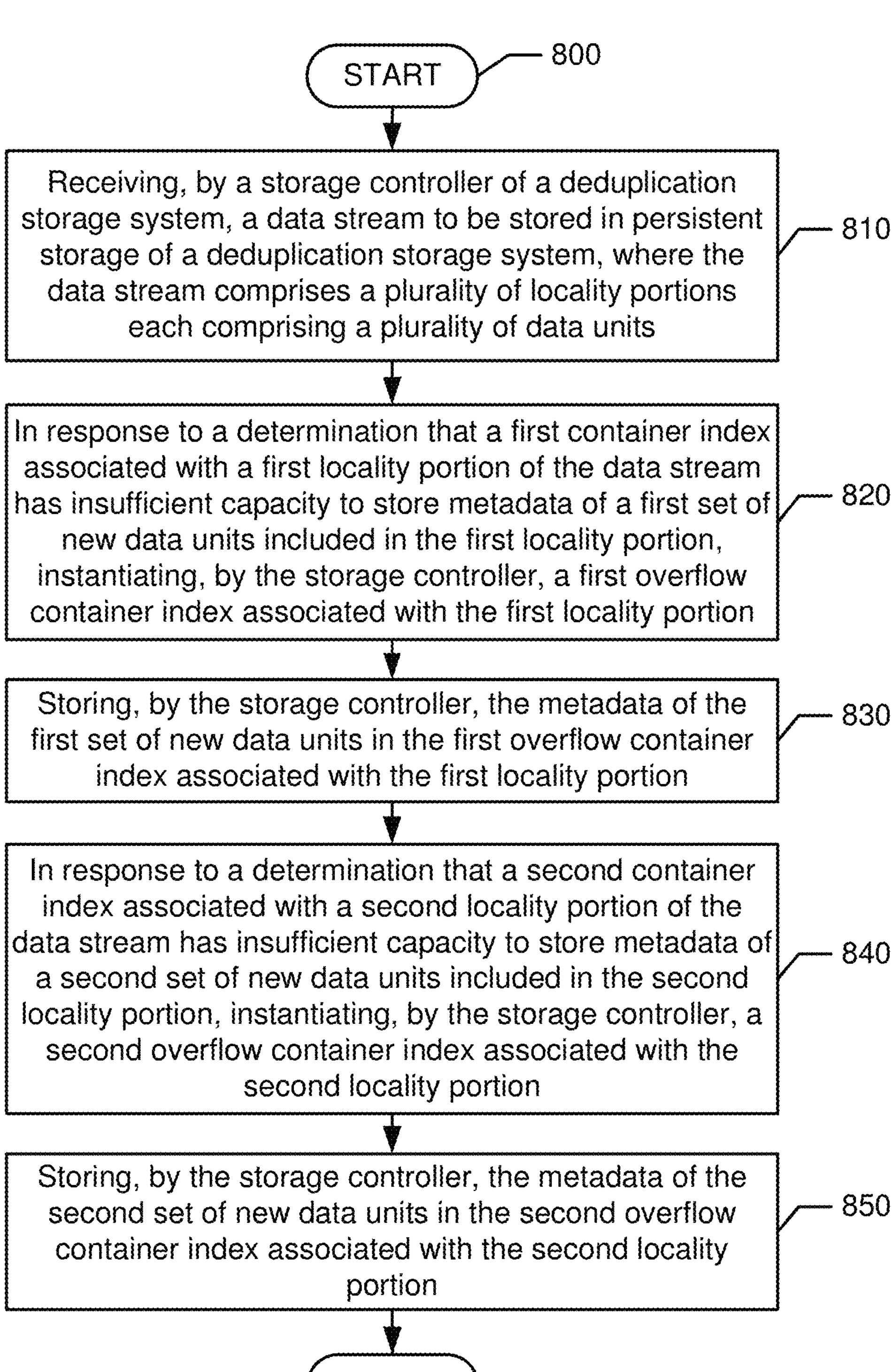
FIG. 8 is an illustration of an example process, in accordance with some implementations.

FIG. 8—Example Process for Storing Data

FIG. 8 shows an example process 800 for storing data, in accordance with some implementations. In some examples, the process 800 may be performed using the storage controller 110 (shown in FIG. 1A). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 810 may include receiving, by a storage controller of a deduplication storage system, a data stream to be stored in persistent storage of a deduplication storage system, where the data stream comprises a plurality of locality portions each comprising a plurality of data units. Block 820 may include, in response to a determination that a first container index associated with a first locality portion of the data stream has insufficient capacity to store metadata of a first set of new data units included in the first locality portion, instantiating, by the storage controller, a first overflow container index associated with the first locality portion. Block 830 may include storing, by the storage controller, the metadata of the first set of new data units in the first overflow container index associated with the first locality portion.

Block 840 may include, in response to a determination that a second container index associated with a second locality portion of the data stream has insufficient capacity to store metadata of a second set of new data units included in the second locality portion, instantiating, by the storage controller, a second overflow container index associated with the second locality portion. Block 850 may include storing, by the storage controller, the metadata of the second set of new data units in the second overflow container index associated with the second locality portion. Blocks 810-850 may correspond generally to the examples described above with reference to instructions 710-750 (shown in FIG. 7).

FIG. 9—Example Machine-Readable Medium

FIG. 9 shows a machine-readable medium 900 storing instructions 910-950, in accordance with some implementations. The instructions 910-950 can be executed by a single processor, multiple processors, a single processing engine, multiple processing engines, and so forth. The machine-readable medium 900 may be a non-transitory storage medium, such as an optical, semiconductor, or magnetic storage medium. The instructions 910-950 may correspond generally to the examples described above with reference to instructions 710-750 (shown in FIG. 7).

Instruction 910 may be executed to receive a data stream to be stored in persistent storage of a deduplication storage system, where the data stream comprises a plurality of locality portions each comprising a plurality of data units. Instruction 920 may be executed to, in response to a determination that a first container index associated with a first locality portion of the data stream has insufficient capacity to store metadata of a first set of new data units included in the first locality portion, instantiate a first overflow container index associated with the first locality portion. Instruction 930 may be executed to store the metadata of the first set of new data units in the first overflow container index associated with the first locality portion.

Instruction 940 may be executed to, in response to a determination that a second container index associated with a second locality portion of the data stream has insufficient capacity to store metadata of a second set of new data units included in the second locality portion, instantiate a second overflow container index associated with the second locality portion. Instruction 950 may be executed to store the metadata of the second set of new data units in the second overflow container index associated with the second locality portion.

CONCLUSION

In accordance with some implementations of the present disclosure, a controller of a deduplication storage system may receive an initial instance of a data stream to be stored in persistent storage. The controller may generate a set of initial container indexes that are associated with different locality portions in the data stream, and may fill each initial container index with metadata for data units included in the locality portion that is associated with that initial container index. Further, when processing a later instance of the data stream, the controller may determine that a new data unit is mapped to an initial container index that lacks storage capacity to store the metadata for the new data unit. In response to this determination, the controller may instantiate an overflow container index that is associated with the initial container index.

Subsequently, when that overflow container index has no available storage capacity, the controller may instantiate another overflow container index that is also associated with the initial container index. The initial container index may be linked or chained to the associated overflow container index(es) (e.g., via pointer(s) to form a group of linked container indexes that are associated with the same locality portion. The controller may then use these linked container indexes to perform deduplication of received data units that are included in the particular locality portion. In this manner, the linked container indexes may provide data localization of metadata used to perform data deduplication, thereby reducing the performance impacts and/or financial costs associated with deduplication. For example, when receiving a set of data units in a particular locality portion of the stream, the storage system may perform deduplication of that set of data units by retrieving and reading a relatively small number of linked container indexes that are associated with that locality portion. Accordingly, use of linked container indexes may reduce the amount of metadata that has to be retrieved from storage and loaded into memory (i.e., in contrast to retrieving and loading a relatively large number of sticky container indexes associated with different locality portions).

Note that, while FIGS. 1A-9 show various examples, implementations are not limited in this regard. For example, referring to FIG. 1A, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:

at least one processor;

a memory; and at least one machine-readable storage storing instructions, the instructions executable by the processor to:

receive a data stream to be stored in persistent storage of a deduplication storage system, wherein the data stream comprises a plurality of locality portions each comprising a plurality of data units;

in response to a determination that a first container index associated with a first locality portion of the data stream has insufficient capacity to store metadata of a first set of new data units included in the first locality portion, instantiate a first overflow container index associated with the first locality portion;

store, in the first container index associated with the first locality portion, a pointer to the first overflow container index associated with the first locality portion;

store the metadata of the first set of new data units in the first overflow container index associated with the first locality portion;

in response to a determination that a second container index associated with a second locality portion of the data stream has insufficient capacity to store metadata of a second set of new data units included in the second locality portion, instantiate a second overflow container index associated with the second locality portion; and store the metadata of the second set of new data units in the second overflow container index associated with the second locality portion.

2. The computing device of claim 1, including instructions executable by the at least one processor to:

store, in the second container index associated with the second locality portion, a pointer to the second overflow container index associated with the second locality portion.

3. The computing device of claim 1, including instructions executable by the at least one processor to:

store, in the first overflow container index associated with the first locality portion, a pointer to the first container index associated with the first locality portion.

4. The computing device of claim 1, including instructions executable by the at least one processor to:

in response to a determination that the first container index associated with the first locality portion has available capacity to store the metadata of the new data units in the first locality portion, store the metadata of the new data units in the first container index associated with the first locality portion.

5. The computing device of claim 1, wherein the metadata for each new data unit comprises:

a fingerprint of the new data unit, a storage location of the new data unit, and a reference count of the new data unit.

6. The computing device of claim 1, including instructions executable by the at least one processor to:

receive, at a first point in time, a first segment of a first instance of the data stream, wherein the first segment is included in a particular locality portion of the data stream;

identify a first set of hook points in the first segment using a sparse fingerprint condition;

compare the first set of hook points to a sparse index; and identify, based on a comparison of the first set of hook points to the sparse index, an initial container index that has a highest match score for the first segment, wherein the initial container index is associated with the particular locality portion.

7. The computing device of claim 6, including instructions executable by the at least one processor to:

receive, at a second point in time, a second segment of a second instance of the data stream, wherein the second segment is included in the particular locality portion of the data stream;

identify a second set of hook points in the second segment using the sparse fingerprint condition;

compare the second set of hook points to the sparse index; and identify, based on a comparison of the second set of hook points to the sparse index, an overflow container index that has a highest match score for the second segment, wherein the overflow container index is associated with the particular locality portion.

8. The computing device of claim 1, wherein the data stream is generated during a particular backup of a data collection.

9. The computing device of claim 8, including instructions executable by the at least one processor to, prior to receiving the data stream generated during the particular backup of the data collection:

receive an initial data stream that is generated during an initial backup of the data collection;

generate initial metadata for data units included in the initial data stream; and record the initial metadata in a set of initial container indexes, wherein each initial container index is filled to a maximum capacity when recording the initial metadata.

10. The computing device of claim 1, including instructions executable by the at least one processor to:

identify a new data unit in the first locality portion of the data stream;

in response to an identification of the new data unit in the first locality portion, identify the first container index associated with the first locality portion;

determine whether the first container index includes at least a threshold number of metadata entries; and in response to a determination that the first container index includes at least the threshold number of metadata entries, determine that the first container index has insufficient capacity to store metadata of the new data unit in the first locality portion.

11. A method comprising:

receiving, by a storage controller of a deduplication storage system, a data stream to be stored in persistent storage of a deduplication storage system, wherein the data stream comprises a plurality of locality portions each comprising a plurality of data units;

in response to a determination that a first container index associated with a first locality portion of the data stream has insufficient capacity to store metadata of a first set of new data units included in the first locality portion, instantiating, by the storage controller, a first overflow container index associated with the first locality portion;

storing in the first container index associated with the first locality portion, by the storage controller, a pointer to the first overflow container index associated with the first locality portion;

storing, by the storage controller, the metadata of the first set of new data units in the first overflow container index associated with the first locality portion;

in response to a determination that a second container index associated with a second locality portion of the data stream has insufficient capacity to store metadata of a second set of new data units included in the second locality portion, instantiating, by the storage controller, a second overflow container index associated with the second locality portion; and storing, by the storage controller, the metadata of the second set of new data units in the second overflow container index associated with the second locality portion.

12. The method of claim 11, comprising:

storing, in the first overflow container index associated with the first locality portion, a pointer to the first container index associated with the first locality portion.

13. The method of claim 11, comprising:

in response to a determination that the first container index associated with the first locality portion has available capacity to store the metadata of the new data units in the first locality portion, storing the metadata of the new data units in the first container index associated with the first locality portion.

14. The method of claim 11, comprising:

receiving an initial data stream that is generated during an initial backup of a data collection;

generating initial metadata for data units included in the initial data stream; and recording the initial metadata in a set of initial container indexes, wherein each initial container index is filled to a maximum capacity when recording the initial metadata.

15. The method of claim 11, wherein the metadata for each new data unit comprises:

a fingerprint of the new data unit, a storage location of the new data unit, and a reference count of the new data unit.

16. A non-transitory machine-readable storage medium comprising instructions executable by at least one processor to:

receive a data stream to be stored in persistent storage of a deduplication storage system, wherein the data stream comprises a plurality of locality portions each comprising a plurality of data units;

in response to a determination that a first container index associated with a first locality portion of the data stream has insufficient capacity to store metadata of a first set of new data units included in the first locality portion, instantiate a first overflow container index associated with the first locality portion;

store, in the first container index associated with the first locality portion, a pointer to the first overflow container index associated with the first locality portion;

store the metadata of the first set of new data units in the first overflow container index associated with the first locality portion;

in response to a determination that a second container index associated with a second locality portion of the data stream has insufficient capacity to store metadata of a second set of new data units included in the second locality portion, instantiate a second overflow container index associated with the second locality portion; and store the metadata of the second set of new data units in the second overflow container index associated with the second locality portion.

17. The non-transitory machine-readable medium of claim 16, including instructions executable by the at least one processor to:

store, in the first overflow container index associated with the first locality portion, a pointer to the first container index associated with the first locality portion.

18. The non-transitory machine-readable medium of claim 16, including instructions executable by the at least one processor to:

in response to a determination that the first container index associated with the first locality portion has available capacity to store the metadata of the new data units in the first locality portion, store the metadata of the new data units in the first container index associated with the first locality portion.

19. The non-transitory machine-readable medium of claim 16, wherein the metadata for each new data unit comprises:

a fingerprint of the new data unit, a storage location of the new data unit, and a reference count of the new data unit.

20. The non-transitory machine-readable medium of claim 16, including instructions executable by the at least one processor to:

identify a new data unit in the first locality portion of the data stream;

in response to an identification of the new data unit in the first locality portion, identify the first container index associated with the first locality portion;

determine whether the first container index includes at least a threshold number of metadata entries; and in response to a determination that the first container index includes at least the threshold number of metadata entries, determine that the first container index has insufficient capacity to store metadata of the new data unit in the first locality portion.

* * * * *